(12) United States Patent
Yoshida et al.

(10) Patent No.: US 10,389,437 B2
(45) Date of Patent: Aug. 20, 2019

(54) DEVICE AND METHOD FOR MEASURING OPTICAL SIGNAL-TO-NOISE RATIO

(71) Applicant: FUJITSU LIMITED, Kawasaki-shi, Kanagawa (JP)

(72) Inventors: Setsuo Yoshida, Inagi (JP); Shoichiro Oda, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/978,450

(22) Filed: May 14, 2018

(65) Prior Publication Data
US 2018/0337727 A1    Nov. 22, 2018

(30) Foreign Application Priority Data
May 18, 2017    (JP) ................... 2017-098656

(51) Int. Cl.
*H04B 10/079* (2013.01)
*H04J 14/08* (2006.01)
*H04J 14/02* (2006.01)

(52) U.S. Cl.
CPC . *H04B 10/07951* (2013.01); *H04B 10/07953* (2013.01); *H04J 14/08* (2013.01); *H04J 14/021* (2013.01)

(58) Field of Classification Search
CPC .............................................. H04B 10/07953
See application file for complete search history.

(56) References Cited

U.S. PATENT DOCUMENTS 6,433,864 B1    8/2002  Chung et al.
2004/0208517 A1*   10/2004  Simard ............ H04B 10/07953
                                                                                  398/26

2016/0308611 A1*   10/2016  Oda .................... H04J 14/06
2017/0041075 A1*    2/2017  Nakagawa ......... H04B 10/2504
2018/0123701 A1*    5/2018  Sato .................... H03K 7/02

FOREIGN PATENT DOCUMENTS

JP    2016-208482    12/2016

OTHER PUBLICATIONS

Shoichiro Oda et al., "Optical performance monitoring for dynamic and flexible photonic netoworks", SPIE Photonics West 2015, Proceedings of SPIE, vol. 9388, 2015, 9 pp.
Setsuo Yoshida et al., "Phototype of Radio Frequency Analysis Based OSNR Monitor Subsystem", IEICE, 2016, 2 pp.

* cited by examiner

*Primary Examiner* — Nathan M Cors
(74) *Attorney, Agent, or Firm* — Staas & Halsey LLP (57) ABSTRACT

An optical signal-to-noise ratio measurement device includes a measurement unit and a determination unit and measures an optical signal-to-noise ratio of an optical signal including a fixed pattern in a specified cycle. The measurement unit measures an optical signal-to-noise ratio of the optical signal respectively in a plurality of time sections in a measurement period so as to generate a plurality of measured values, a length of the measurement period being the same or substantially the same as a length of the specified cycle. The determination unit selects, from the plurality of measured values generated by the measurement unit, at least one measured value other than a worst measured value in the plurality of measured values, and determines an optical signal-to-noise ratio of the optical signal based on the selected at least one measured value.

6 Claims, 12 Drawing Sheets

Related Art

Related Art

DEVICE AND METHOD FOR MEASURING OPTICAL SIGNAL-TO-NOISE RATIO

CROSS-REFERENCE TO RELATED APPLICATION

This application is based upon and claims the benefit of priority of the prior Japanese Patent Application No. 2017-098656, filed on May 18, 2017, the entire contents of which are incorporated herein by reference.

FIELD

The embodiments discussed herein are related to a device and a method for measuring an optical signal-to-noise ratio.

BACKGROUND

There has been a demand to monitor an OSNR in real time in each node in an optical network. For example, an OSNR of each wavelength channel is monitored in an optical network that transmits a wavelength division multiplexed (WDM) optical signal. Then, an optical path is flexibly controlled for each wavelength channel according to a result of monitoring an OSNR.

However, when an OSNR is monitored in each node, an expensive measurement device such as an optical spectrum analyzer is not desirable in order to reduce costs for establishing an optical network. In addition, in a WDM transmission system (such as a superchannel transmission system) in which frequency spacing between channels is narrow, it is difficult to measure a noise component using an optical spectrum analyzer.

Thus, there is a demand for a configuration and a method that make it possible to measure, without using expensive optical equipment, an OSNR in a WDM transmission system in which frequency spacing between channels is narrow. For example, a method for estimating an OSNR by electric signal processing has been proposed. In this method, a received optical signal is converted into an electric signal using a photo detector, and DC power and AC power are measured using this electric signal. Then, an OSNR is estimated according to the measured DC power and the measured AC power. Related technologies are disclosed in Japanese Laid-open Patent Publication No. 2016-208482, U.S. Pat. No. 6,433,864, and the following document. S. Oda et al. Optical performance monitoring for dynamic and flexible photonic networks, SPIE Photonics West 2015, 9388-13

In many optical networks, data is transmitted using a frame of a specified format. In general, the frame is configured by a payload and a header. Data is stored in the payload. Control information used to control a transmission of a data signal is stored in the header. A fixed pattern may be set in the header. The fixed pattern is configured by predetermined data or a predetermined bit string and used to establish a frame synchronization. Further, the fixed pattern may be used to measure a dispersion of an optical fiber link.

Polarization multiplexing has been put into practical use as a technology that increases a transmission capacity of an optical signal. The polarization multiplexing can transmit a signal using a set of polarizations that are orthogonal to each other. The set of polarizations that are orthogonal to each other may be referred to as an "X polarization" and a "Y polarization".

Figure 1:
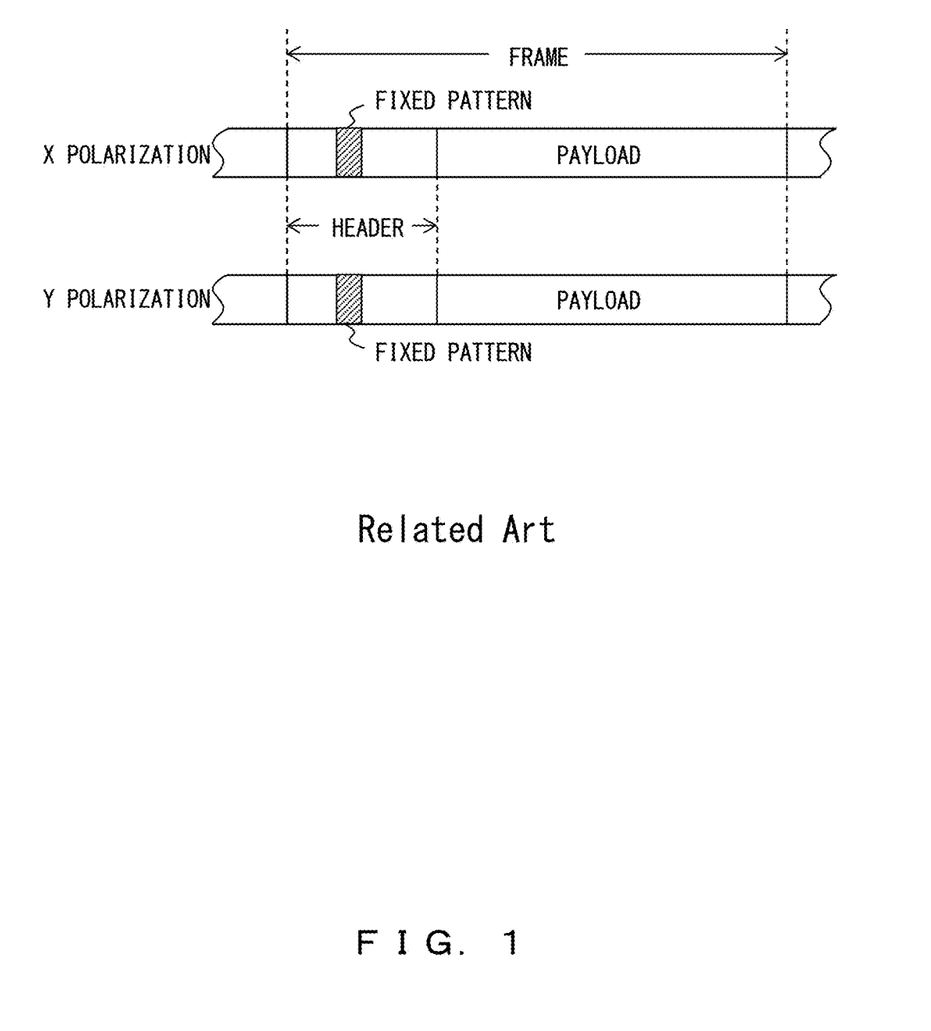
FIG. 1 illustrates an example of frames in which fixed patterns are set.

In a polarization multiplexed optical transmission, frames that are transmitted using a set of polarizations are synchronized with each other, as illustrated in FIG. 1. Here, the fixed pattern described above is set in a position specified in advance in each frame. In other words, the fixed pattern of an X polarization and the fixed pattern of a Y polarization are concurrently transmitted. Here, when the same fixed pattern is transmitted by the X polarization and by the Y polarization, the polarization of a polarization multiplexed optical signal is fixed. On the other hand, the bit pattern in a payload portion is random, so the polarization state in the payload portion is random. As a result, when this optical signal is transmitted through an optical transmission link having a normal polarization-dependent loss (PDL) and the received optical signal is converted into an electric signal using a photo detector in an OSNR monitor, spike noise corresponding to the fixed pattern occurs in the electric signal because the optical powers in a fixed pattern portion and the payload portion are different from each other. Even if a fixed pattern in which an optical power in a fixed pattern portion is different from an optical power in a payload portion is used, spike noise may also occur. The spike noise corresponds to a state in which power varies greatly and instantaneously.

Figure 2A:
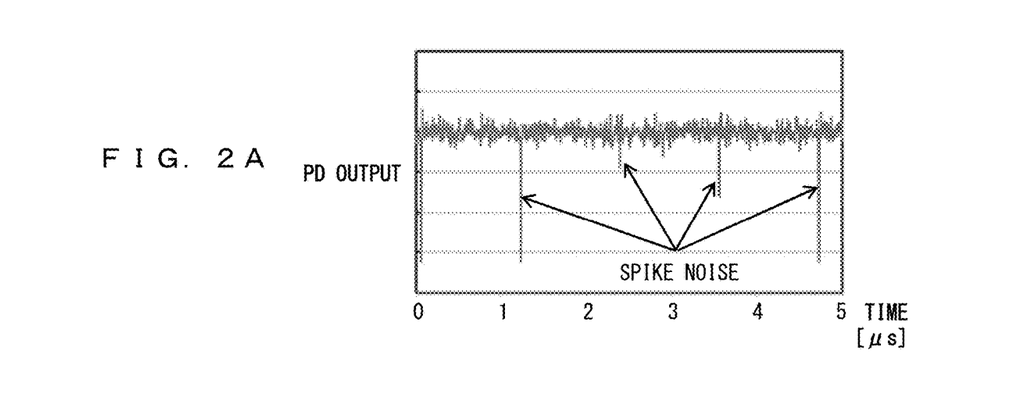
FIGS. 2A and 2b are diagrams that explain a problem of a conventional technology.

FIG. 2A illustrates an example of an output signal of a photo detector that converts a received optical signal into an electric signal. In this example, each frame carried by an optical signal includes a fixed pattern, as illustrated in FIG. 1. In this case, spike noise corresponding to the fixed pattern occurs in an output signal of a photo detector, as illustrated in FIG. 2A. However, spike noise occurs on one of the positive side and the negative side with respect to an average power level. In the example illustrated in FIG. 2A, spike noise only occurs on the negative side. The intensity of the spike noise is random, so low-frequency white noise occurs due to this spike noise. Further, it is difficult to remove positive/negative asymmetric spike noise with a random intensity using a low pass filter. Accordingly, it is difficult to measure DC power and AC power of a received optical signal accurately, and thus it is difficult to measure OSNR of the optical signal.

Figure 2B:
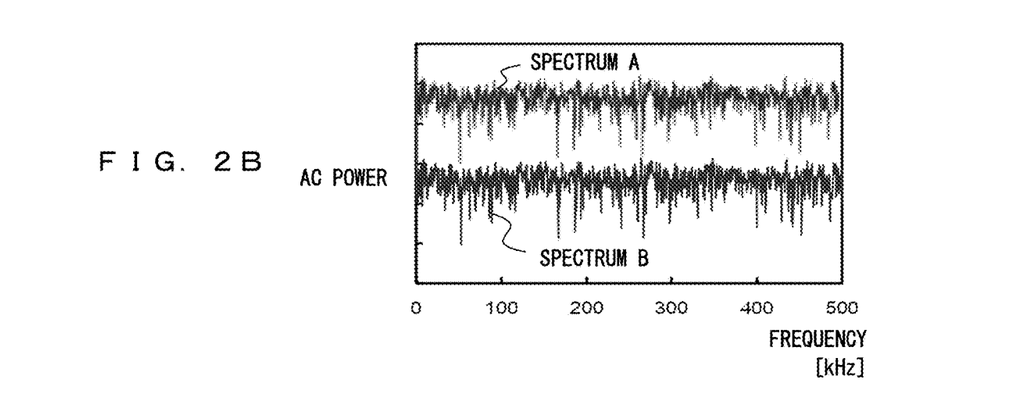

In FIG. 2B, a spectrum A represents a spectrum of an optical signal into which a fixed pattern has been inserted. In other words, the spectrum A represents a spectrum of the signal illustrated in FIG. 2A. A spectrum B represents a spectrum when only a payload has been transmitted. In other words, the spectrum B represents a spectrum of an optical signal into which a fixed pattern has not been inserted. Here, AC power is calculated by integrating a spectrum in a specified frequency range (such as 100 kHz to 500 kHz). However, as illustrated in FIG. 2B, an average power is increased when a fixed pattern is inserted into an optical signal. Further, an amount of increased average power due to a fixed pattern depends on a PDL. Thus, DC power when a payload is transmitted is not accurately measured, and an estimated OSNR value includes a large error.

SUMMARY

According to an aspect of the present invention, an optical signal-to-noise ratio measurement device measures an optical signal-to-noise ratio of an optical signal including a fixed pattern in a specified cycle. The optical signal-to-noise ratio measurement device includes: a measurement unit configured to measure an optical signal-to-noise ratio of the optical signal respectively in a plurality of time sections in a measurement period so as to generate a plurality of measured values, a length of the measurement period being the same or substantially the same as a length of the specified cycle; and a determination unit configured to select, from the plurality of measured values generated by the measurement unit, at least one measured value other than a worst measured value in the plurality of measured values, and determine an optical signal-to-noise ratio of the optical signal based on the selected at least one measured value.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 3:
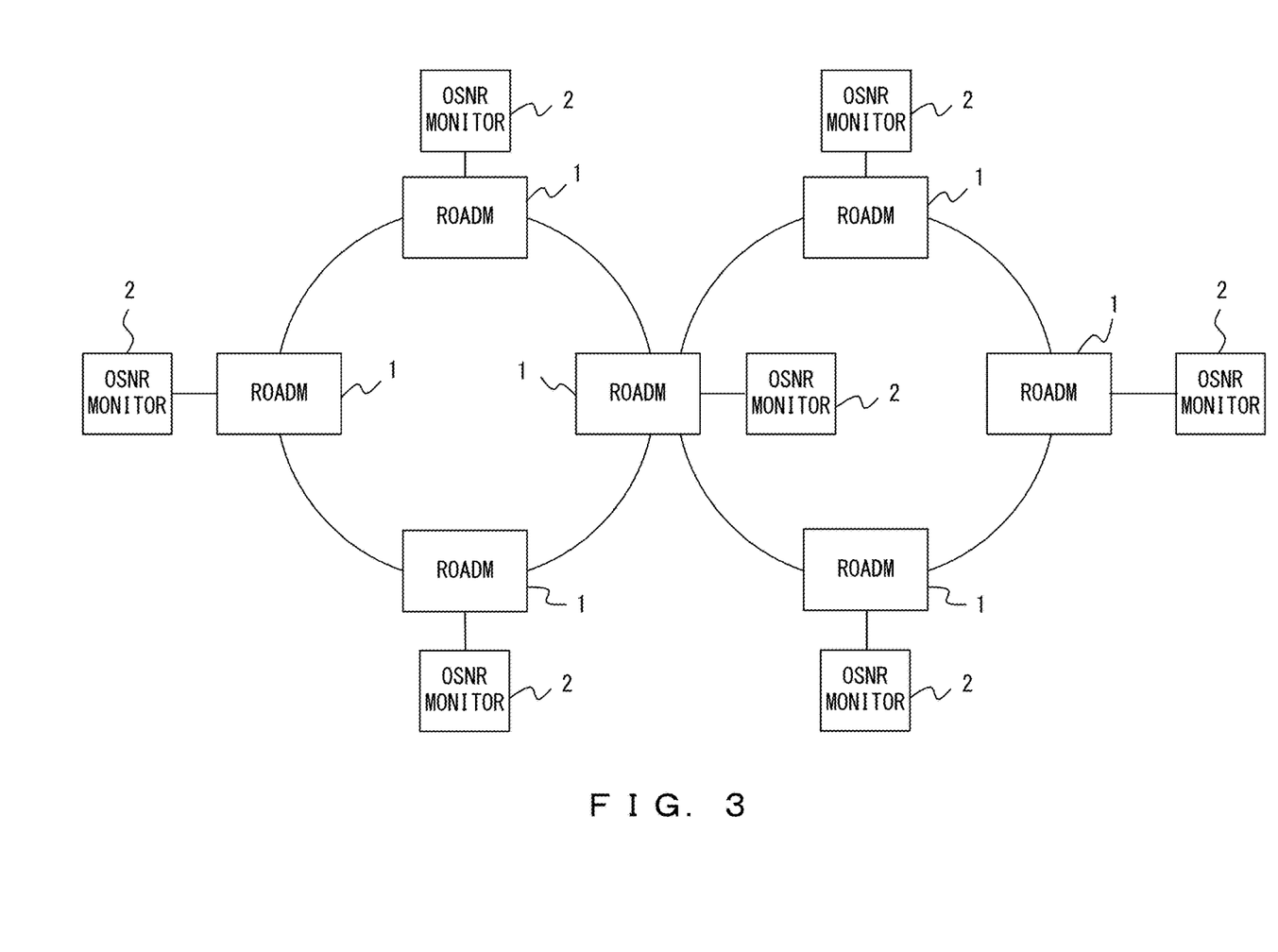
FIG. 3 illustrates an example of an optical network.

FIG. 3 illustrates an example of an optical network according to embodiments of the present invention. In this example, an optical network transmits a WDM optical signal. Thus, a reconfigurable optical add drop multiplexer (ROADM) 1 is implemented in each node of the optical network. The ROADM 1 can drop an optical signal of a desired wavelength channel from a WDM optical signal. Further, the ROADM 1 can add an optical signal to an empty wavelength channel of a WDM optical signal.

An OSNR monitor 2 is implemented in each node. The OSNR monitor 2 monitors an OSNR of each wavelength channel of a WDM optical signal transmitted through an optical fiber link. The OSNR monitor 2 is an example of an optical signal-to-noise ratio measurement device that measures an optical signal-to-noise ratio of an optical signal.

Figure 4:
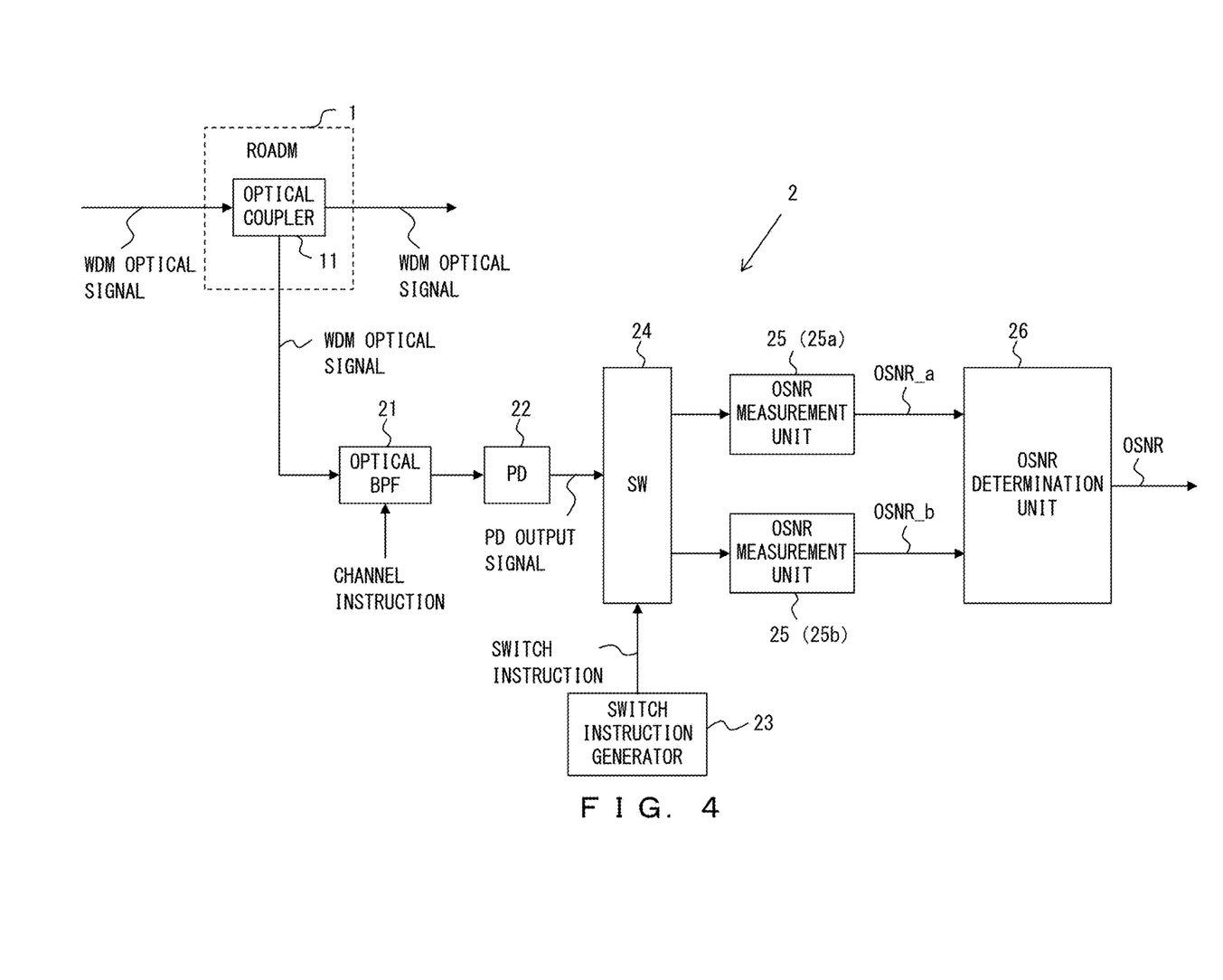
FIG. 4 illustrates an example of an OSNR monitor according to an embodiment of the present invention.

FIG. 4 illustrates an example of the OSNR monitor 2 according to an embodiment of the present invention. As illustrated in FIG. 3, the OSNR monitor 2 is implemented in each node of the optical network. The ROADM 1 processes a WDM optical signal in each node. Further, as illustrated in FIG. 4, the ROADM 1 includes an optical coupler 11 that splits a WDM optical signal. A WDM optical signal is split by the optical coupler 11 and guided to the OSNR monitor 2.

A plurality of wavelength channels are multiplexed in a WDM optical signal. In the example illustrated in FIG. 5, wavelength channels n−1, n, n+1, . . . are multiplexed. The channel spacing of the WDM optical signal may be narrow such that a spectrum of each wavelength channel overlaps a spectrum of an adjacent channel. Further, amplified spontaneous emission (ASE) noise depends on a wavelength, so it has a different intensity in each wavelength channel.

The OSNR monitor 2 includes an optical bandpass filter (BPF) 21, a photo detector (PD) 22, a switch instruction generator 23, a switch 24, OSNR measurement units 25 (25a, 25b), and an OSNR determination unit 26. The OSNR monitor 2 may include other functions or circuit elements that are not illustrated in FIG. 4. For example, the OSNR monitor 2 may include a controller that controls measurement processing performed in the OSNR monitor 2.

The optical BPF 21 extracts a portion of an optical power of a monitoring target wavelength channel according to a channel instruction given by a controller (not illustrated). In other words, a center wavelength in a pass band of the optical BPF 21 is controlled according to a channel instruction. In the example illustrated in FIG. 5, the optical BPF 21 extracts a portion of an optical power of a wavelength channel n. Here, the optical power extracted by the optical BPF 21 includes a signal component and a noise component. The width of a pass band of the optical BPF 21 is determined according to, for example, a bit rate and a modulation format of each optical signal multiplexed in a WDM optical signal.

Figure 5:
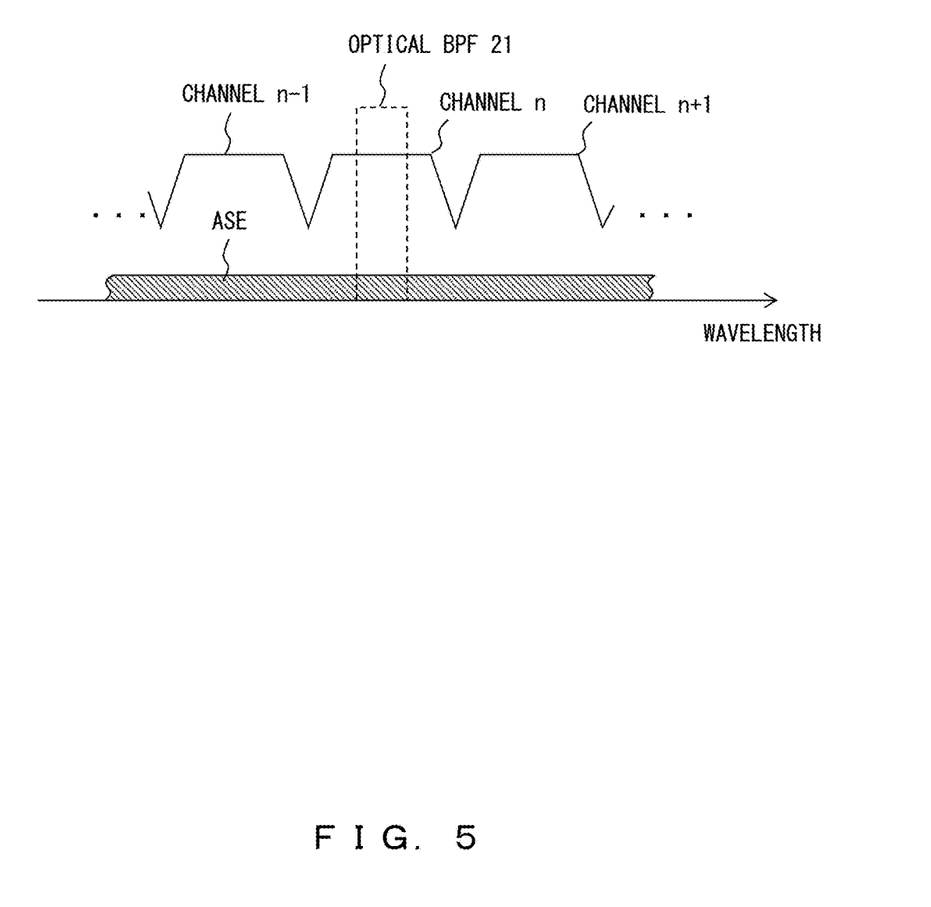
FIG. 5 illustrates an example of a WDM optical signal.

The photo detector 22 converts an output light of the optical BPF 21 into an electric signal. In other words, an electric signal output from the photo detector 22 represents an optical power of a monitoring target wavelength channel. As illustrated in FIG. 5, this optical power includes a signal component and a noise component. Thus, the electric signal output from the photo detector 22 includes a signal component and a noise component of a monitoring target wavelength channel. In the following descriptions, the output signal of the photo detector 22 may be referred to as a "PD output signal". An averaging unit that averages a PD output signal may be implemented on the output side of the photo detector 22. In this case, the averaging unit may be implemented by, for example, a low pass filter used as an anti-aliasing filter.

The switch instruction generator 23 generates a switch instruction. The switch instruction will be described in detail later. The switch 24 guides a PD output signal (or an averaged PD output signal) to the OSNR measurement unit 25a or the OSNR measurement unit 25b according to the switch instruction generated by the switch instruction generator 23.

The OSNR measurement unit (25a, 25b) measures an OSNR of a monitoring target wavelength channel according to a PD output signal. In the following descriptions, measured OSNR values obtained by the OSNR measurement unit 25a and the OSNR measurement unit 25b may be referred to as OSNR_a and OSNR_b, respectively. The OSNR determination unit 26 determines an OSNR of the monitoring target wavelength channel according to a result of the measurement performed by the OSNR measurement units 25a and 25b. For example, the OSNR determination unit 26 outputs a measured value representing better characteristics among OSNR_a and OSNR_b.

The switch instruction generator 23, the switch 24, the OSNR measurement unit 25 (25a, 25b), and the OSNR determination unit 26 are implemented by, for example, a digital signal processing circuit. In this case, the digital signal processing circuit may be implemented by, for example, a field programmable gate array (FPGA) or an application specific integrated circuit (ASIC). Further, the switch instruction generator 23, the switch 24, the OSNR measurement unit 25, and the OSNR determination unit 26 may be implemented by a processor system that includes a processor element and a memory. Moreover, the switch instruction generator 23, the switch 24, the OSNR measurement unit 25, and the OSNR determination unit 26 may be implemented by a combination of software and hardware. When the OSNR measurement unit 25 is implemented by a digital signal processing circuit or a processor system, a PD output signal generated by the photo detector 22 is converted into a digital signal by an A/D converter (not illustrated).

Figure 6:
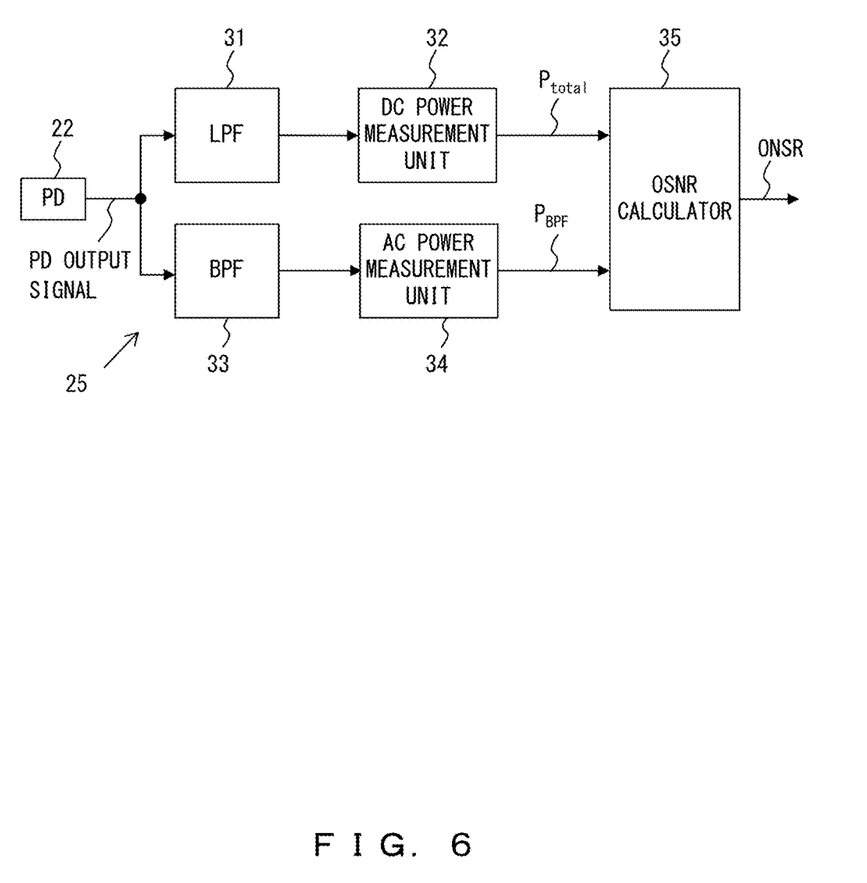
FIG. 6 illustrates an example of an OSNR measurement unit.

FIG. 6 illustrates an example of the OSNR measurement unit 25. The OSNR measurement unit 25 illustrated in FIG. 6 corresponds to the OSNR measurement unit 25a, 25b illustrated in FIG. 4. Thus, a PD output signal is input to the OSNR measurement unit 25. In other words, an electric signal that represents a power of a received optical signal is given to the OSNR measurement unit 25. The switch 24 illustrated in FIG. 4 is omitted in FIG. 6.

Figure 7A:
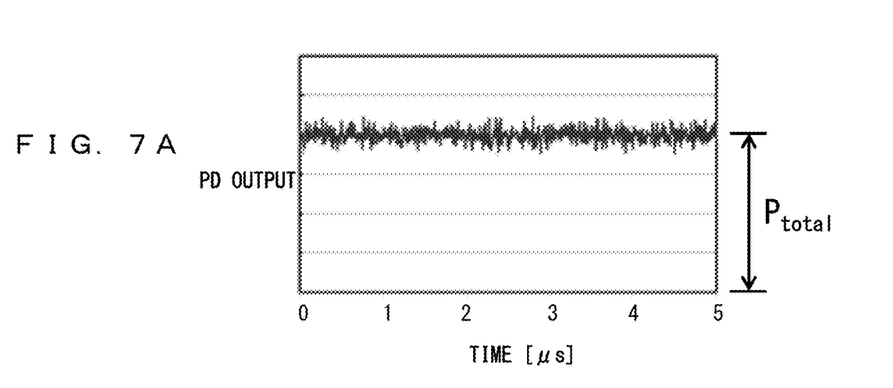
FIGS. 7A and 7B are examples of a PD output signal and of a power spectrum of a received optical signal.

As illustrated in FIG. 6, the OSNR measurement unit 25 includes a low pass filter (LPF) 31, a DC power measurement unit 32, a band pass filter (BPF) 33, an AC power measurement unit 34, and an OSNR calculator 35. The PD output signal illustrated in FIG. 7A is input to the OSNR measurement unit 25. The PD output signal is generated by the photo detector 22 and represents a power (or an intensity) of a received optical signal.

The LPF 31 extracts a DC component of an input electric signal. In other words, the LPF 31 extracts a DC component of a PD output signal. Thus, the cutoff frequency of the LPF 31 may be, for example, about 1 kHz. The DC power measurement unit 32 measures a power of the DC component extracted by the LPF 31. Here, the power of a DC component corresponds to an average of a total optical power of a received optical signal. In other words, an average optical power $P_{total}$ illustrated in FIG. 7A is measured by the LPF 31 and the DC power measurement unit 32.

The BPF 33 extracts a specified frequency component from an input electric signal. In other words, the BPF 33 extracts a specified frequency component from a PD output signal. At this point, the BPF 33 removes a DC component. In other words, the BPF 33 extracts a specified AC component. For example, the BPF 33 extracts frequency components of 100 to 500 kHz. The AC power measurement unit 34 measures a power of the AC component extracted by the BPF 33, that is, a noise AC power $P_{BPF}$.

The frequency range of a passband of the BPF 33 is not limited to the example described above. However, the cutoff frequency on the low-frequency side of a passband of the BPF 33 is determined such that a DC component is removed. Further, the cutoff frequency on the high-frequency side of the passband of the BPF 33 is determined such that a noise component that occurs in the OSNR monitor 2 (such as switching noise of a switching power supply) is removed.

There is a relationship represented by Formula (1) between the average optical power $P_{total}$, the noise AC power $P_{BPF}$, and an OSNR. Here, $P_{sig}$ represents an optical power of an optical signal, $P_{ASE}$ represents an optical power of an ASE, and $C_1$ to $C_6$ each represent a calibration factor predetermined by measurement.

$$P_{total} = P_{sig} \cdot C_1 \cdot \left(1 + \frac{C_2}{OSNR}\right) \quad (1)$$

-continued
$$P_{BPF} = C_3 + P_{sig}^2 \cdot C_4 \cdot \left(1 + \frac{C_5}{OSNR} + \frac{C_6}{OSNR^2}\right)$$

$$OSNR = \frac{P_{sig}}{P_{ASE}}$$

Thus, the OSNR measurement unit 25 can calculate an OSNR of a received optical signal by measuring an average optical power $P_{total}$ and a noise AC power $P_{BPF}$.

Figure 7B:
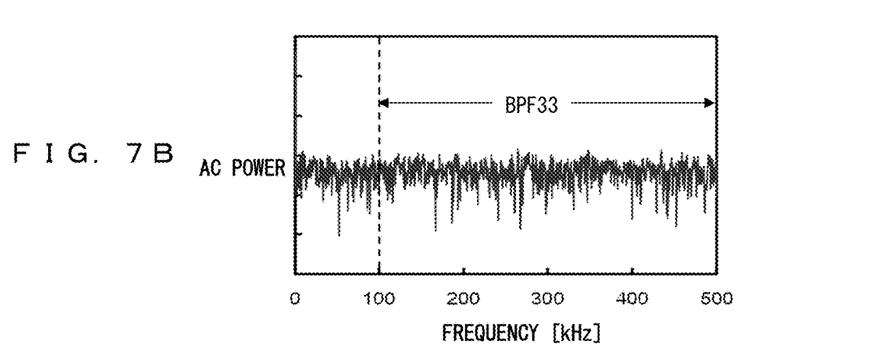

The BPF 33 and the AC power measurement unit 34 may calculate a noise AC power $P_{BPF}$ using, for example, a fast Fourier transform (FFT). In this case, a PD output signal generated by the photo detector 22 is converted into a digital signal by an A/D converter and is sampled at different timings. Then, a power spectrum of a received optical signal is generated by performing an FFT calculation with respect to a plurality of values obtained by the sampling. FIG. 7B illustrates an example of a power spectrum of a received optical signal. Further, a noise AC power $P_{BPF}$ is calculated by integrating this power spectrum in a specified frequency range (such as 100 kHz to 500 kHz). The frequency range in which a power spectrum is integrated corresponds to the passband of the BPF 33.

The LPF 31 and the DC power measurement unit 32 may also measure an average optical power $P_{total}$ by using an FFT. In this case, an average optical power $P_{total}$ is calculated by integrating the power spectrum illustrated in FIG. 7B in a specified frequency range (such as zero to 1 kHz).

Figure 8:
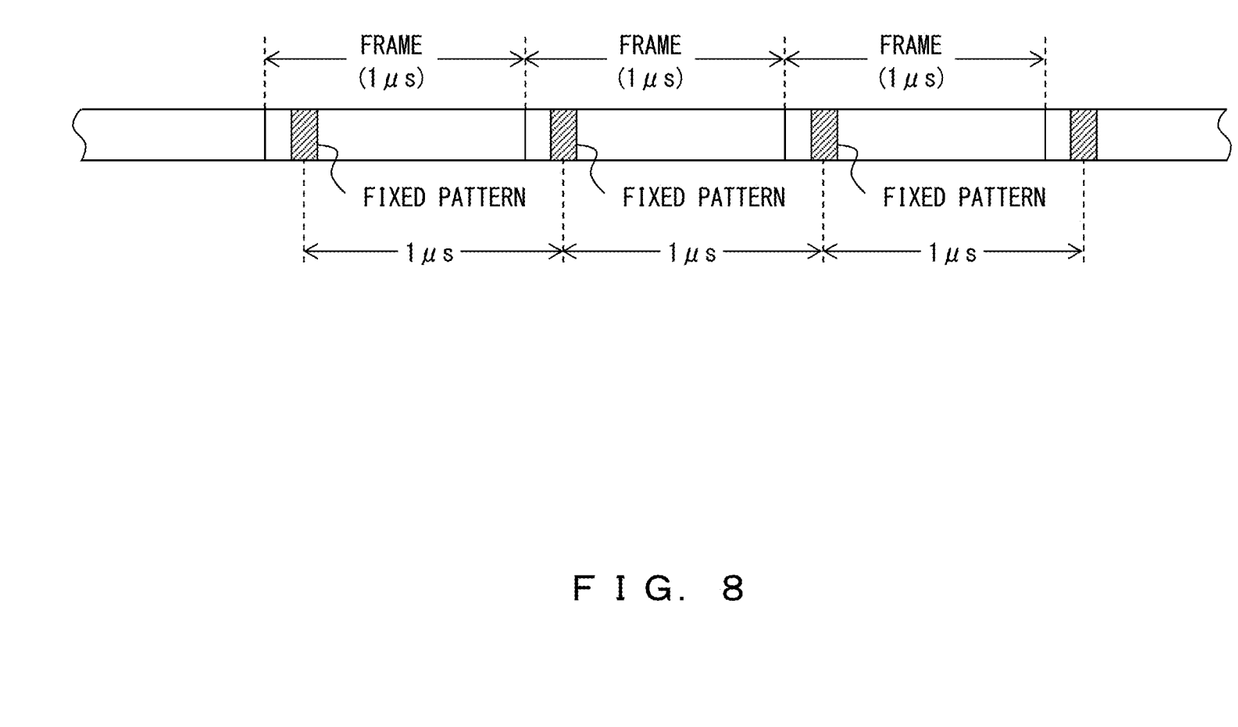
FIG. 8 illustrates an example of a configuration of a frame transmitted in an optical network according to embodiments.

FIG. 8 illustrates an example of a configuration of a frame transmitted in the optical network according to the embodiments of the present invention. In this example, the length of a frame is 1 μs. Further, a fixed pattern is set in a specified position in each frame. Thus, when the frames illustrated in FIG. 6 are consecutively transmitted, a fixed pattern will be transmitted at 1-μs intervals. The length of a fixed pattern is, for example, about 10 ns. The fixed pattern is configured by specified data or a specified bit string and used to establish a frame synchronization. Further, the fixed pattern may be used to measure a dispersion of an optical fiber link.

In this example, a WDM optical signal is transmitted in an optical network. A polarization multiplexed optical signal is transmitted through each wavelength channel. In this case, frames transmitted using a set of polarizations (an X polarization and a Y polarization) of each polarization multiplexed optical signal are synchronized with each other, as illustrated in FIG. 1. Thus, the fixed pattern of an X polarization and the fixed pattern of a Y polarization are concurrently transmitted. The fixed pattern of an X polarization and the fixed pattern of a Y polarization may be configured by the same bit string.

Figure 9:
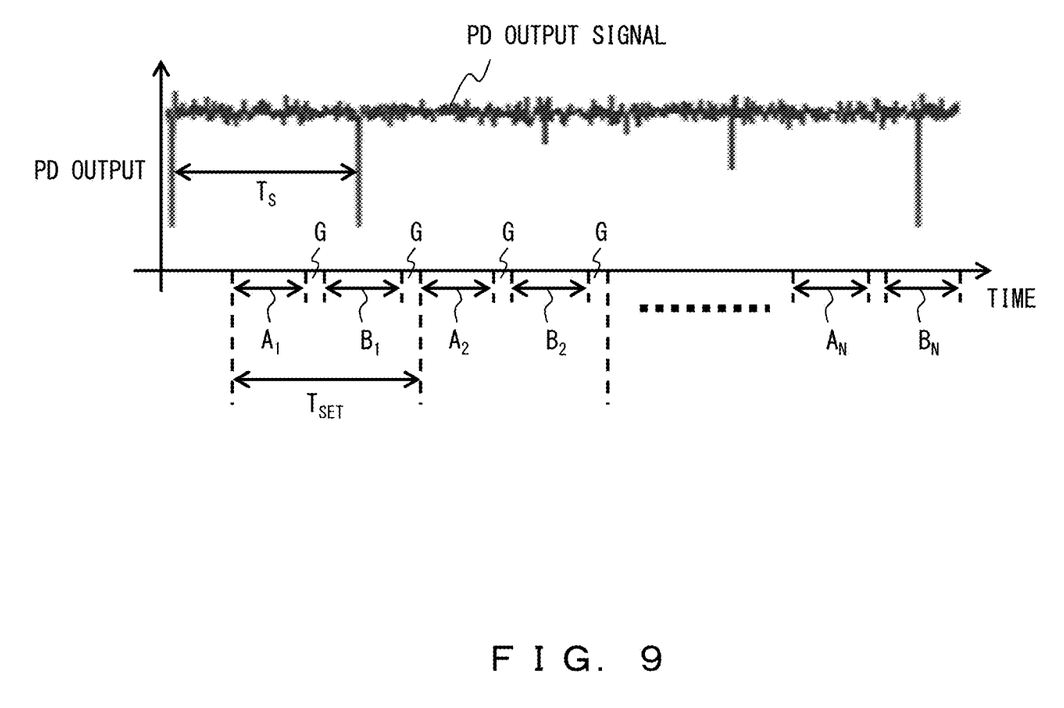
FIG. 9 illustrates an example of a measurement period and a measurement time section.

FIG. 9 illustrates an example of a measurement period and a time section set in the measurement period. The PD output signal illustrated in FIG. 9 represents an output signal of the photo detector 22 when the OSNR monitor 2 receives the optical signal illustrated in FIG. 8. A fixed pattern is inserted into each frame in the optical signal illustrated in FIG. 8. When the same bit string is transmitted as a fixed pattern by an X polarization and a Y polarization, the polarization of the optical signal is fixed. Thus, when the optical signal is transmitted through an optical transmission link having a PDL and the received optical signal is then converted into an electric signal using the photo detector 22 in the OSNR monitor 2, spike noise corresponding to the fixed pattern occurs in a PD output signal because the optical powers in a payload portion and a fixed pattern portion are different from each other. In other words, a power of a PD output signal varies greatly and instantaneously according to a fixed pattern. In the example illustrated in FIG. 9, spike noise occurs periodically on the negative side with respect to the average level of a PD output signal.

A cycle $T_s$ in which spike noise occurs is substantially the same as a frame cycle. Thus, when the frame illustrated in FIG. 8 is transmitted, the cycle $T_s$ in which spike noise occurs is also 1 µs. In other words, in this case, spike noise occurs at 1 µs intervals. However, the intensity of the spike noise is not always the same, that is, substantially random.

The switch instruction generator 23 generates a switch signal in synchronization with a measurement period (measurement cycle) $T_{set}$ corresponding to the frame cycle. In this example, the measurement period $T_{set}$ is substantially the same as the frame cycle. In other words, the measurement period $T_{set}$ is substantially the same as the cycle $T_s$ in which spike noise occurs.

The measurement period $T_{set}$ is divided into a plurality of time sections. In this example, the measurement period $T_{set}$ is divided into a measurement time section A, a measurement time section B, and two gap time sections G. One of the two gap time sections G is provided between the measurement time section A and the measurement time section B in each measurement period. The other gap time section G is provided between the measurement time section B in a certain measurement period and the measurement time section A in the next measurement period. It is preferable that the lengths of the measurement time section A and the measurement time section B be substantially the same as each other. The length of the gap time section G is sufficiently shorter than the measurement time section A or the measurement time section B.

The switch instruction generator 23 generates a switch instruction that indicates a switching timing between the measurement time section A, the measurement time section B, and the gap time section G. The switch instruction may be a pulse signal that represents a starting timing of the measurement time section A, the measurement time section B, or the gap time section G.

The switch 24 guides a PD output signal (that is, an output signal of the photo detector 22) to the OSNR measurement unit 25a or the OSNR measurement unit 25b illustrated in FIG. 4 according to the switch instruction. Specifically, the switch 24 guides a PD output signal to the OSNR measurement unit 25a in the measurement time section A. Further, the switch 24 guides the PD output signal to the OSNR measurement unit 25b in the measurement time section B. The switch 24 discards the PD output signal in the gap time section G. Thus, both the OSNR measurement unit 25a and the OSNR measurement unit 25b do not receive the PD output signal in the gap time section G.

In this example, the OSNR monitor 2 performs N sets of sampling in order to measure an OSNR of one wavelength channel. Here, N represents the number of input values for the FFT calculation described above and is, for example, 4096, although it is not limited to number. Thus, in FIG. 9, $A_1$ and $B_1$ respectively represent a measurement time section A and a measurement time section B in the initial measurement period. Likewise, $A_2$ and $B_2$ respectively represent a measurement time section A and a measurement time section B in the second measurement period, and $A_N$ and $B_N$ respectively represent a measurement time section A and a measurement time section B in the final measurement period.

The starting time of the measurement period $T_{set}$ does not always have to be synchronized with the starting time of a received frame. In other words, the switch instruction generator 23 can generate a switch instruction without establishing a frame synchronization. In the example illustrated in FIG. 9, the measurement period $T_{set}$ is set such that spike noise is included in the measurement time section B. However, as described above, the measurement period $T_{set}$ is substantially the same as a frame cycle (that is, the cycle $T_s$ in which spike noise occurs). Thus, as illustrated in FIG. 9, when spike noise is included in a measurement time section B in a certain measurement period, spike noise will be included in a measurement time section B in each measurement period. In this case, spike noise will not be included in a measurement time section A in any measurement period.

The switch instruction generated in this way is given to the switch 24. Then, the switch 24 guides a PD output signal to the OSNR measurement unit 25a or 25b according to the switch instruction.

Figure 10:
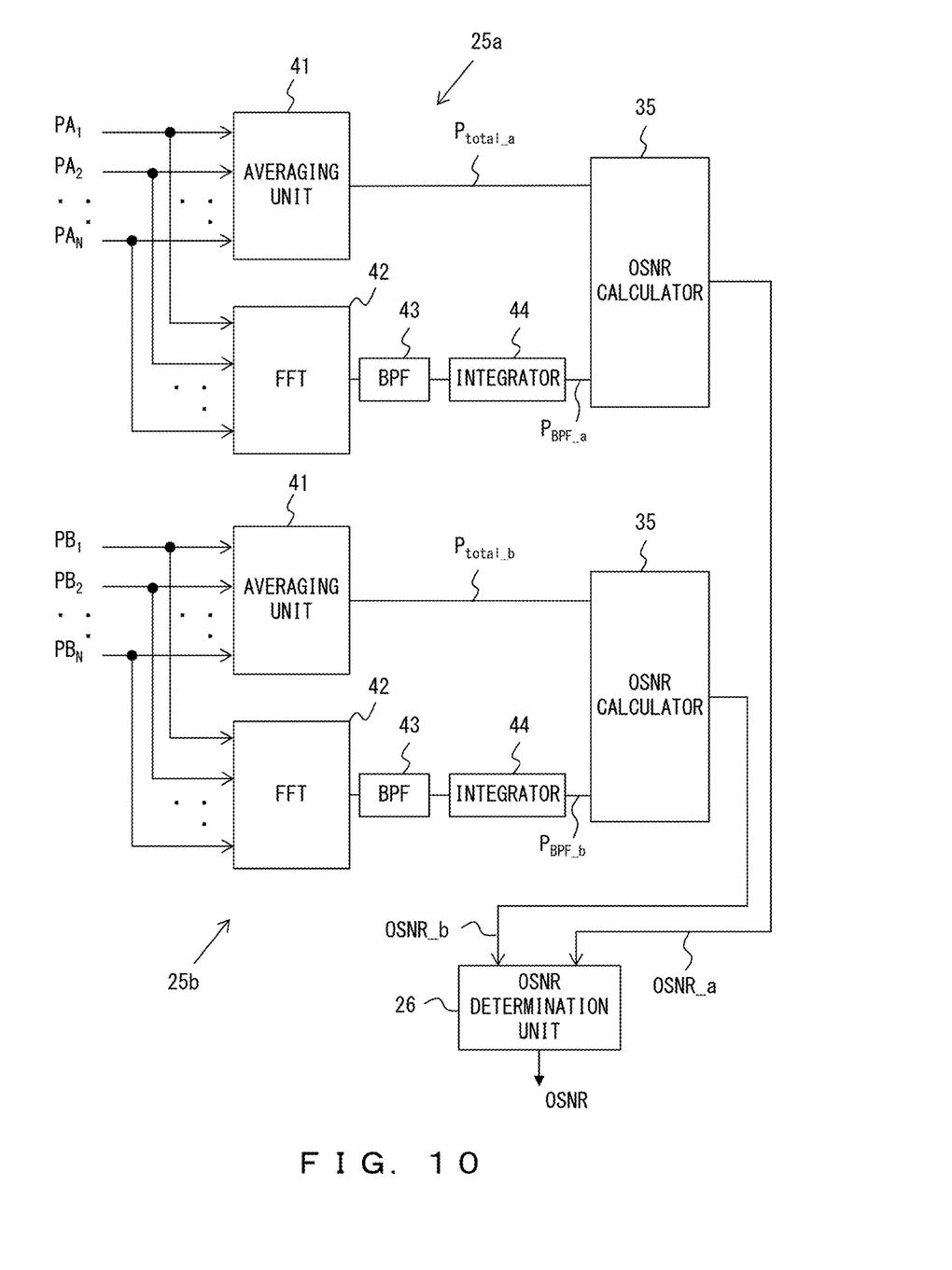
FIG. 10 illustrates an example of an operation of the OSNR monitor.

FIG. 10 illustrates an example of an operation of the OSNR monitor 2. It is assumed that, in this example, sampling illustrated in FIG. 9 is performed with respect to a PD output signal generated by the photo detector 22. In other words, N sets of sampling are performed.

$PA_i$ represents an average value of a power detected in a measurement time section A in the i-th measurement period. For example, a signal $PA_1$ represents an average value of a power detected in a measurement time section A ($A_1$) in the initial measurement period, a signal $PA_2$ represents an average value of a power detected in a measurement time section A ($A_2$) in the second measurement period, and a signal $PA_N$ represents an average value of a power detected in a measurement time section A ($A_N$) in the final measurement period. The "average value of a power detected in a measurement time section A" is obtained by calculating an average of a plurality of power values obtained by performing sampling multiple times in the measurement time section A. Likewise, $PB_j$ represents an average value of a power detected in a measurement time section B in the j-th measurement period.

Specifically, in the initial measurement period, a measured value $PA_1$ generated based on measurement performed in the measurement time section $A_1$ is given to the OSNR measurement unit 25a, and a measured value $PB_1$ generated based on measurement performed in the measurement time section $B_1$ is given to the OSNR measurement unit 25b. Next, in the second measurement period, a measured value $PA_2$ generated based on measurement performed in the measurement time section $A_2$ is given to the OSNR measurement unit 25a, and a measured value $PB_2$ generated based on measurement performed in the measurement time section $B_2$ is given to the OSNR measurement unit 25b. Likewise, a measured value PA and a measured value PB that are generated based on measurement performed in each measurement period are respectively given to the OSNR measurement unit 25a and the OSNR measurement unit 25b. Then, in the final measurement period, a measured value $PA_N$ generated based on measurement performed in the measurement time section $A_N$ is given to the OSNR measurement unit 25a, and a measured value $PB_N$ generated based on measurement performed in the measurement time section $B_N$ is given to the OSNR measurement unit 25b.

In the OSNR measurement unit 25a, an averaging unit 41 calculates an average of $PA_1$ to $PA_N$ so as to calculate an average optical power $P_{total\_a}$ with respect to a measurement sequence A ($A_1$ to $A_N$). The averaging unit 41 corresponds to the LPF 31 and the DC power measurement unit 32 illustrated in FIG. 6. An FFT calculator 42 performs an FFT calculation with respect to $PA_1$ to $PA_N$ so as to generate a power spectrum of a received optical signal with respect to the measurement sequence A. A BPF 43 extracts a specified frequency component from the power spectrum generated by the FFT calculator 42. In this example, AC components of 100 to 500 kHz are extracted as illustrated in FIG. 7B. An integrator 44 integrates the AC components extracted by the BPF 43 so as to calculate a noise AC power $P_{BPF\_a}$ with respect to the measurement sequence A. The FFT calculator 42, the BPF 43, and the integrator 44 correspond to the BPF 33 and the AC power measurement unit 34 illustrated in FIG. 6. The OSNR calculator 35 calculates OSNR_a representing a measured OSNR value with respect to the measurement sequence A according to the average optical power $P_{total\_a}$ and the noise AC power $P_{BPF\_a}$. Here, the OSNR calculator 35 calculates an OSNR using Formula (1) described above.

Likewise, the OSNR measurement unit 25b calculates an average optical power $P_{total\_b}$ and a noise AC power $P_{BPF\_b}$ with respect to a measurement sequence B ($B_1$ to $B_N$) based on $PB_1$ to $PB_N$. Then, the OSNR measurement unit 25b calculates OSNR_b representing a measured OSNR value with respect to the measurement sequence B according to the average optical power $P_{total\_b}$ and the noise AC power $P_{BPF\_b}$.

The OSNR determination unit 26 determines an OSNR of a monitoring target wavelength channel according to OSNR_a and OSNR_b respectively calculated by the OSNR measurement units 25a and 25b. Here, the cycle $T_s$ in which spike noise occurs and the measurement period $T_{set}$ are substantially the same as each other. Thus, as illustrated in FIG. 9, when spike noise is included in the measurement time section $B_1$ in the initial measurement period, spike noise will also be included in each of the subsequent measurement time sections $B_2$ to $B_N$. On the other hand, spike noise will not be included in each of the measurement time sections $A_1$ to $A_N$. Thus, OSNR_a calculated according to sampling performed in each of the measurement time sections $A_1$ to $A_N$ is an OSNR that has not been affected by spike noise.

When the starting time of the measurement period $T_{set}$ is not synchronized with the starting time of a received frame, whether spike noise is included in the measurement sequence $A_1$-$A_N$ or in the measurement sequence $B_1$-$B_N$ is not known. However, for example, when spike noise is included in the measurement sequence $B_1$-$B_N$, OSNR_b calculated according to sampling performed in the measurement sequence $B_1$-$B_N$ will be worse (or lower) than OSNR_a calculated according to sampling performed in the measurement sequence $A_1$-$A_N$. In this case, the OSNR determination unit 26 determines that OSNR_b has been affected by spike noise. Thus, the OSNR determination unit 26 outputs a better or higher OSNR (in this example, OSNR_a) as an OSNR of a monitoring target wavelength channel. As a result, an OSNR that has not been affected by spike noise is obtained.

In the example described above, the spike noise cycle $T_s$ and the measurement period $T_{SET}$ are substantially the same as each other. However, the measurement period $T_{SET}$ may not completely match the spike noise cycle $T_s$. When the difference between the spike noise cycle $T_s$ and the measurement period $T_{SET}$ is not zero, the timing at which spike noise occurs in each measurement period will be shifted. Thus, in this case, while sampling is performed N times, spike noise may be included in a measurement time section A in a certain measurement period, and spike noise may be included in a measurement time section B in another measurement period. In this case, an effect of spike noise will occur in both of the measurement time sections A and B.

The gap time section G is set in order to overcome this problem. Here, the length of the gap time section G is determined so as to satisfy the following condition. $T_{SN}$ represents a duration of spike noise that occurs due to a fixed pattern. N represents the order of an FFT. ΔT represents a difference between the spike noise cycle $T_s$ and the measurement period $T_{SET}$.

$$G > T_{SN} + N \times \Delta T$$

For example, it is assumed that the duration of spike noise $T_{SN}$ is 10 ns, the order N of an FFT is 4096, and the difference ΔT between a spike noise cycle and a measurement period is 10 ps. In this case, it is preferable that the length of the gap time section G to be longer than 50.96 ns. If such a gap time section G is set, an effect of spike noise will not occur in one of the measurement time section A and B. In other words, if such a gap time section G is set, an OSNR that has not been affected by spike noise will be obtained from at least one of the measurement sequence $A_1$-$A_N$ and the measurement sequence $B_1$-$B_N$.

Variation of Measurement Time Section

In the example illustrated in FIG. 9, two measurement time sections (A, B) are set in each measurement period. In this case, two OSNRs (OSNR_a, OSNR_b) are calculated, and one of the two OSNRs is selected. However, the embodiments of the present invention are not limited to this method.

For example, in the example illustrated in FIGS. 9 and 10, when spike noise occurs in a gap time section G, both OSNR values (OSNR_a, OSNR_b) are not affected by spike noise. In this case, OSNR_a and OSNR_b are substantially the same as each other, so the OSNR determination unit 26 may output OSNR_a or OSNR_b.

Further, three or more measurement time sections may be set in each measurement period. For example, when five measurement time sections are set in each measurement period, five OSNR values are generated. In this case, the OSNR determination unit 26 excludes the worst OSNR value from the five OSNR values and outputs one of the other OSNR values. Further, the OSNR determination unit 26 may exclude the worst OSNR value from the five OSNR values and output an average of the other OSNR values. Furthermore, the OSNR determination unit 26 may output the best OSNR value in the five OSNR values.

When two measurement time sections are set in each measurement period, the OSNR monitor 2 includes two OSNR measurement units 25 (25a, 25b) and calculates two OSNR values (OSNR_a, OSNR_b). Thus, when K measurement time sections are set in each measurement period, the OSNR monitor 2 includes K OSNR measurement units 25 and calculates K OSNR values.

Figure 11:
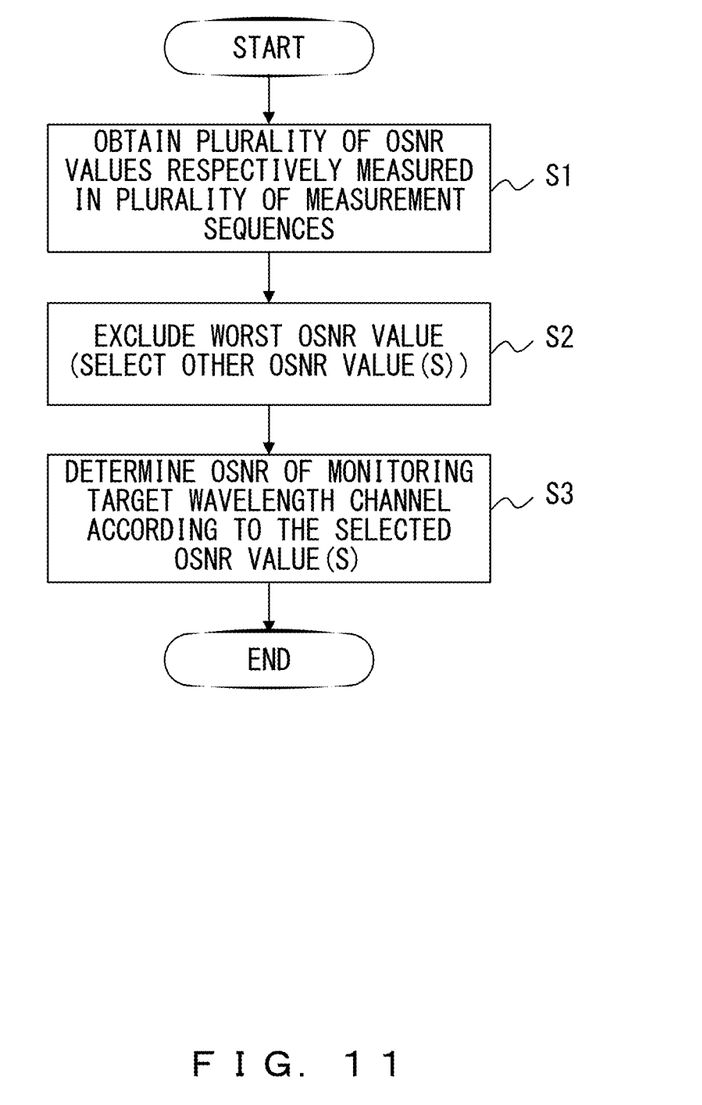
FIG. 11 illustrates a flowchart that illustrates an example of processing performed by an OSNR determination unit.

FIG. 11 illustrates a flowchart that illustrates an example of processing performed by the OSNR determination unit 26. The processing of this flowchart is performed when a plurality of OSNR values are generated for a monitoring target wavelength channel. In the example illustrated in FIG. 4 or 10, the plurality of OSNR values are generated by the OSNR measurement units 25a and 25b.

In S1, the OSNR determination unit 26 obtains a plurality of measured OSNR values that are respectively measured in a plurality of measurement sequences. In the example illustrated in FIG. 9, the plurality of measurement sequences correspond to the measurement time sections $A_1$ to $A_N$ and $B_1$ to $B_N$. In the example illustrated in FIG. 4 or 10, the plurality of measured OSNR values correspond to OSNR_a and OSNR_b respectively generated by the OSNR measurement unit 25a and the OSNR measurement unit 25b.

In S2, the OSNR determination unit 26 excludes the worst (that is, the lowest) OSNR value from the plurality of measured OSNR values. In other words, the OSNR determination unit 26 selects at least one measured OSNR value other than the worst measured OSNR value from the plurality of measured OSNR values. For example, in the example illustrated in FIGS. 9 and 10, it is assumed that OSNR_b calculated according to sampling performed in each of the measurement time sections $B_1$ to $B_N$ is lower than OSNR_a calculated according to sampling performed in each of the measurement time sections $A_1$ to $A_N$. In this case, OSNR_b is excluded from two measured OSNR values, and OSNR_a is selected.

When the OSNR determination unit 26 obtains three or more measured OSNR values in S1, the OSNR determination unit 26 may exclude the worst measured OSNR value, or it may sequentially exclude two or more measured OSNR values in order from the worst measured OSNR value. In any case, at least one measured OSNR value will be selected.

In S3, the OSNR determination unit 26 determines an OSNR of a monitoring target wavelength channel according to the at least one measured OSNR value selected in S2. When the OSNR determination unit 26 selects only one measured OSNR value in S2, the OSNR determination unit 26 outputs the selected measured OSNR value as an OSNR of a monitoring target wavelength channel. On the other hand, when the OSNR determination unit 26 selects a plurality of measured OSNR values in S2, the OSNR determination unit 26 may determine an OSNR of a monitoring target wavelength channel by one of the following methods.

(1) Select one of the plurality of measured OSNR values obtained in S2 and output the selected measured OSNR value (2) Calculate an average of the plurality of measured OSNR values obtained in S2 and output the average In the example illustrated in FIG. 9, a gap time section G is provided between measurement time sections in each measurement period, but the embodiments of the present invention are not limited to this method. In other words, there is no need to provide a gap time section G in every measurement period. For example, there is no need to provide a gap time section G when it is possible to accurately match a measurement period $T_{set}$ with a frame cycle or a cycle $T_s$ in which spike noise occurs.

Other Embodiment

In the embodiment illustrated in FIG. 4, one OSNR measurement unit 25 is implemented for each of the measurement sequences (A, B). On the other hand, in another embodiment, one OSNR measurement unit 25 is implemented for a plurality of measurement sequences. The OSNR measurement unit 25 performs measurement with respect to the plurality of measurement sequences in time division multiplexing.

Figure 12:
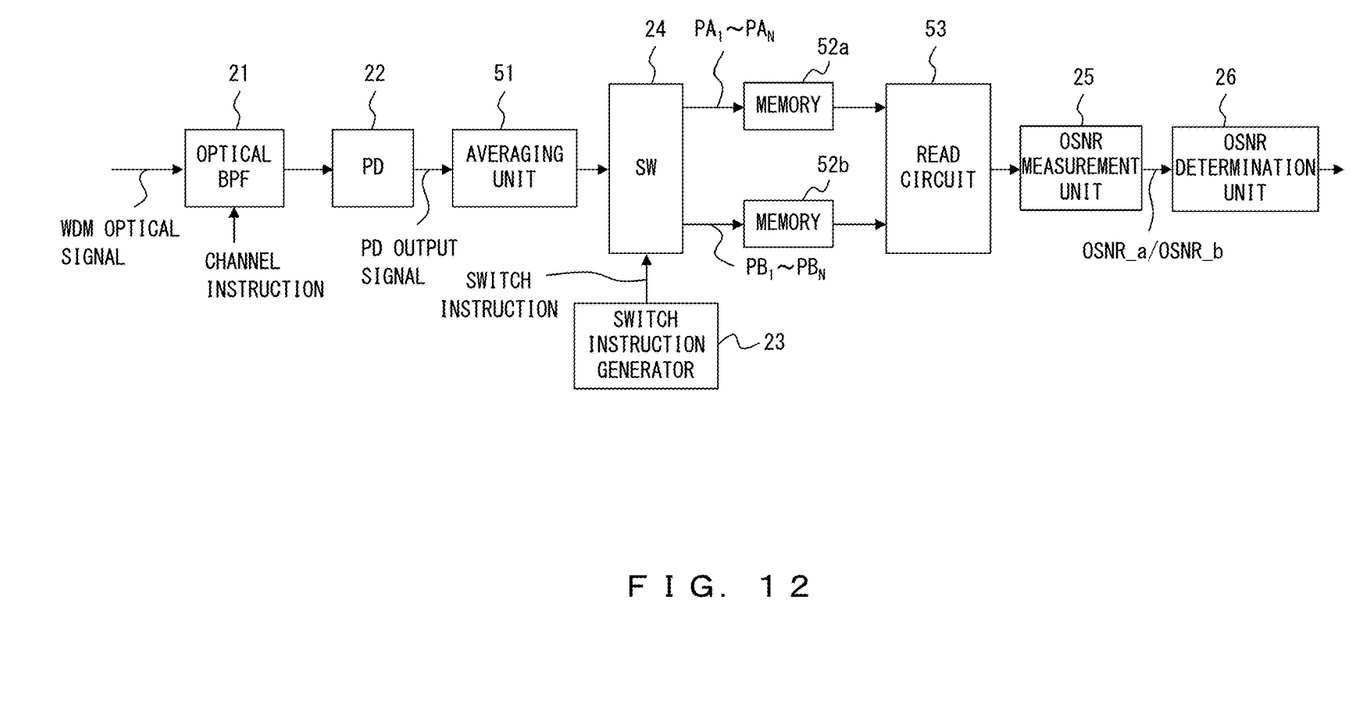
FIG. 12 illustrates an example of an OSNR monitor according to another embodiment of the present invention.

FIG. 12 illustrates an example of an OSNR monitor according to another embodiment of the present invention. The optical BPF 21, the photo detector 22, the switch instruction generator 23, the switch 24 and the OSNR determination unit 26 are substantially the same in the embodiment illustrated in FIG. 4 and in the other embodiment illustrated in FIG. 12.

An averaging unit 51 averages an output signal of the photo detector 22 (that is, a PD output signal). The averaging unit 51 is implemented by, for example, a low pass filter used as an anti-aliasing filter.

The switch 24 guides an averaged PD output signal to a memory 52a or 52b according to a switch instruction generated by the switch instruction generator 23. In the example illustrated in FIG. 9, power values $PA_1$ to $PA_N$ respectively detected in the measurement time sections $A_1$ to $A_N$ are stored in the memory 52a, and power values $PB_1$ to $PB_N$ respectively detected in the measurement time sections $B_1$ to $B_N$ are stored in the memory 52b.

When N power values are stored in each of the memories 52a and 52b, a read circuit 53 reads power values from the memories 52a and 52b. Specifically, first, the read circuit 53 reads the power values $PA_1$ to $PA_N$ from the memory 52a and gives them to the OSNR measurement unit 25. By doing this, OSNR_a is generated in the OSNR measurement unit 25. Next, the read circuit 53 reads the power values $PB_1$ to $PB_N$ from the memory 52b and gives them to the OSNR measurement unit 25. By doing this, OSNR_b is generated in the OSNR measurement unit 25. Then, the OSNR determination unit 26 determines an OSNR of a monitoring target wavelength channel according to OSNR_a and OSNR_b.

As described above, in the embodiment illustrated in FIG. 12, one OSNR measurement unit 25 is implemented for a plurality of measurement sequences. In other words, one OSNR measurement unit 25 is shared by a plurality of measurement sequences, and the OSNR measurement unit 25 generates measured OSNR values of the plurality of measurement sequences in time division multiplexing. Thus, when the OSNR measurement unit 25 is implemented by a digital signal processing circuit, the circuit area for implementing the OSNR measurement unit 25 can be reduced, compared to the case of the configuration illustrated in FIG. 4.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical signal-to-noise ratio measurement device that measures an optical signal-to-noise ratio of an optical signal including a fixed pattern in a specified cycle, the optical signal-to-noise ratio measurement device comprising:
    a measurement unit that measures an optical signal-to-noise ratio of the optical signal respectively in a plurality of time sections in a measurement period so as to generate a plurality of measured values, a length of the measurement period being the same or substantially the same as a length of the specified cycle; and
    a determination unit that selects, from the plurality of measured values generated by the measurement unit, at least one measured value other than a worst measured value in the plurality of measured values, and determines an optical signal-to-noise ratio of the optical signal based on the selected at least one measured value.

2. The optical signal-to-noise ratio measurement device according to claim 1, further comprising
    a photo detector that converts the optical signal into an electric signal, wherein the measurement unit measures, in each of the plurality of time sections, an optical signal-to-noise ratio of the optical signal according to a plurality of values obtained by repeatedly sampling the electric signal in synchronization with the measurement period.

3. The optical signal-to-noise ratio measurement device according to claim 1, wherein
the measurement unit measures an optical signal-to-noise ratio of the optical signal in two of the plurality of time sections in the measurement period so as to obtain two measured values, and
the determination unit outputs, as an optical signal-to-noise ratio of the optical signal, a measured value representing better characteristics from among the two measured values obtained by the measurement unit.

4. The optical signal-to-noise ratio measurement device according to claim 1, wherein
the measurement period includes a first time section, a second time section adjacent to the first time section, a third time section adjacent to the second time section, and a fourth time section adjacent to the third time section,
the measurement unit measures an optical signal-to-noise ratio of the optical signal in the first time section and the third time section so as to obtain two measured values, and
the determination unit outputs, as an optical signal-to-noise ratio of the optical signal, a measured value representing better characteristics from among the two measured values obtained by the measurement unit.

5. The optical signal-to-noise ratio measurement device according to claim 4, further comprising
a photo detector that converts the optical signal into an electric signal, wherein
the measurement unit measures, in each of the first time section and the third time section, an optical signal-to-noise ratio of the optical signal based on N values obtained by sampling the electric signal N times in synchronization with the measurement period, and
lengths of the second time section and the fourth time section are both longer than a duration obtained by adding, to a duration of a noise component due to the fixed pattern, a duration obtained by multiplying a difference between the specified cycle and the measurement period by N.

6. The optical signal-to-noise ratio measurement device according to claim 1, wherein the measurement unit measures an optical signal-to-noise ratio in the plurality of time sections in time division multiplexing.

* * * * *